United States Patent
McIntyre et al.

(10) Patent No.: US 9,731,814 B2
(45) Date of Patent: Aug. 15, 2017

(54) ALTERNATIVE METHOD TO DETERMINE THE AIR MASS STATE OF AN AIRCRAFT AND TO VALIDATE AND AUGMENT THE PRIMARY METHOD

(71) Applicant: The Boeing Company, Chicago, IL (US)

(72) Inventors: Melville Duncan Walter McIntyre, Bellevue, WA (US); Andrew W. Houck, Woodinville, WA (US); Russell T. Bridgewater, Monroe, WA (US); Robert Erik Freeman, Seattle, WA (US); Paul Salo, Lynnwood, WA (US); Douglas L. Wilson, Mercer Island, WA (US); Jonathan K. Moore, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/282,875

(22) Filed: May 20, 2014

(65) Prior Publication Data
US 2014/0330455 A1   Nov. 6, 2014

Related U.S. Application Data

(63) Continuation of application No. 12/255,233, filed on Oct. 21, 2008, now Pat. No. 8,761,970.

(51) Int. Cl.
*G06F 7/00*   (2006.01)
*G06F 17/00*   (2006.01)
*B64C 19/00*   (2006.01)
*B64C 13/50*   (2006.01)
*G01P 5/16*   (2006.01)
(Continued)

(52) U.S. Cl.
CPC ............ *B64C 19/00* (2013.01); *B64C 13/503* (2013.01); *B64D 43/00* (2013.01); *G01P 5/16* (2013.01); *G01P 13/025* (2013.01)

(58) Field of Classification Search
USPC ....... 701/6, 14, 3; 73/170.02, 182, 179–180; 702/50, 92, 144, 147, 57; 340/975–976; 224/175
See application file for complete search history.

(56) References Cited

U.S. PATENT DOCUMENTS 3,885,431 A * 5/1975 Gallington ................. 73/180
3,942,376 A * 3/1976 Gallington ................. 73/180
(Continued)

OTHER PUBLICATIONS

Angle-of-attack sensor analysis and calibration method for a heavy jet transport; Case, D.; Digital Avionics Systems Conference, 1996., 15th AIAA/IEEE; Digital Object Identifier: 10.1109/DASC.1996. 585475; Publication Year: 1996 , pp. 279-283.*
(Continued)

*Primary Examiner* — Cuong H Nguyen
(74) *Attorney, Agent, or Firm* — Patterson + Sheridan, LLP (57) ABSTRACT

A method, apparatus, and computer program product for identifying air data for an aircraft. The lift for the aircraft is identified. The number of surface positions for the aircraft is identified. The angle of attack during flight of the aircraft is identified. A synthetic dynamic pressure is computed from the lift, the number of surface positions, and the angle of attack.

24 Claims, 6 Drawing Sheets

(51) Int. Cl.
*G01P 13/02* (2006.01)
*B64D 43/00* (2006.01)

(56) References Cited

U.S. PATENT DOCUMENTS

| | | | | |
|---|---|---|---|---|
| 4,110,605 | A * | 8/1978 | Miller | G01M 1/127 701/124 |
| 4,235,104 | A * | 11/1980 | Hoadley | G05D 1/0615 73/180 |
| 5,078,338 | A * | 1/1992 | O'Neill | B64C 3/42 244/46 |
| 6,668,640 | B1 * | 12/2003 | Alwin et al. | 73/170.02 |
| 6,941,805 | B2 * | 9/2005 | Seidel | B64D 43/02 73/170.02 |
| 7,137,592 | B2 * | 11/2006 | Barocela | B64B 1/06 244/123.11 |
| 7,703,423 | B2 * | 4/2010 | Burgess | F01L 1/024 123/195 R |
| 8,121,747 | B2 * | 2/2012 | Loots et al. | 701/16 |
| 8,175,761 | B2 * | 5/2012 | Nichols et al. | 701/14 |
| 8,180,504 | B1 * | 5/2012 | Nance | B64C 25/00 701/16 |
| 8,234,058 | B1 * | 7/2012 | Barber et al. | 701/120 |
| 8,665,120 | B2 * | 3/2014 | Thoreen | 340/975 |
| 8,761,970 | B2 * | 6/2014 | McIntyre | B64C 13/503 340/975 |
| 2004/0261518 | A1 * | 12/2004 | Seidel | B64D 43/02 73/182 |
| 2005/0258306 | A1 * | 11/2005 | Barocela | B64C 39/10 244/30 |
| 2005/0269441 | A1 * | 12/2005 | Barocela | B64B 1/06 244/25 |
| 2006/0237594 | A1 * | 10/2006 | Najmabadi | B64C 13/16 244/195 |
| 2007/0095987 | A1 * | 5/2007 | Glezer | B64C 21/08 244/200.1 |
| 2007/0107646 | A1 * | 5/2007 | Alvarez-Calderon | B63B 1/14 114/56.1 |
| 2008/0114506 | A1 * | 5/2008 | Davis | G05B 23/024 701/16 |
| 2008/0127916 | A1 * | 6/2008 | Burgess | F01L 1/024 123/54.4 |
| 2008/0265102 | A1 * | 10/2008 | Larssen | B64C 7/00 244/203 |
| 2009/0018703 | A1 * | 1/2009 | Mangalam | G01M 9/06 700/282 |
| 2009/0292405 | A1 * | 11/2009 | Najmabadi | B64C 13/16 701/3 |
| 2010/0100260 | A1 * | 4/2010 | McIntyre | B64C 13/503 701/6 |
| 2010/0211237 | A1 * | 8/2010 | Nichols et al. | 701/14 |
| 2011/0208375 | A1 * | 8/2011 | Spoerry | G01P 13/025 701/14 |
| 2014/0081483 | A1 * | 3/2014 | Weinmann et al. | 701/14 |

OTHER PUBLICATIONS

Ground moving target engagement by cooperative UAVs; Schumacher, C.; American Control Conference, 2005. Proceedings of the 2005; DOI: 10.1109/ACC.2005.1470705; Publication Year: 2005, pp. 4502-4505 vol. 7.*

Aircraft Angle of Attack and Air Speed Detection by Redundant Strip Pressure Sensors; Sergio Callegari et al., ARCES/DEIS, University of Bologna, II School of Engineering; 2004 IEEE, pp. 1526-1529 vol. 3.*

Pressure belt: an integrated multisensor system; Tanielian, M.H.; Kim, N.P.; Sensors, 2002. Proceedings of IEEE vol. 2; Digital Object Identifier: 10.1109/ICSENS.2002.1037282; Publication Year: 2002, pp. 1182-1187 vol. 2.*

A hybrid system approach to airspeed, angle of attack and sideslip estimation in Unmanned Aerial Vehicles; Mohammad Shaqura; Christian Claudel; Unmanned Aircraft Systems (ICUAS), 2015 International Conference on; Year: 2015 ; pp. 723-732, Doi: 10.1109/ICUAS.2015.7152355.*

A Novel Micro Air Vehicle with Flexible Wing Integrated with On-board Electronic Devices; Fuxing Zhang; Rong Zhu; Peng Liu; Wei Xiong; Xudong Liu; Zhaoying Zhou; 2008 IEEE Conference on Robotics, Automation and Mechatronics; Year: 2008; pp. 252-257, DOI: 10.1109/RAMECH.2008.4681386.*

Application and validation of HUNS3D flow solver for aerodynamic drag prediction cases; Haris Hameed Mian; Gang Wang; Muhammad Aamir Raza; Proceedings of 2013 10th International Bhurban Conference on Applied Sciences & Technology (IBCAST); Year: 2013; pp. 209-218, DOI: 10.1109/IBCAST.2013.6512156.*

CFD analysis of viscous flow over delta-rectangular wing; Subhash Shinde; Akshoy Ranjan Paul; Anuj Jain; 2013 Students Conference on Engineering and Systems (SCES); Year: 2013; pp. 1-6, DOI: 10.1109/SCES.2013.6547537.*

Aircraft angle of attack and air speed detection by redundant strip pressure sensors; Callegari, S.; Talamelli, A.; Zagnoni, M.; Golfarelli, A.; Rossi, V.; Tartagni, M.; Sangiorgi, E.;Sensors, 2004. Proceedings of IEEE; Digital Object Identifier: 10.1109/ICSENS.2004.1426479; Publication Year: 2004, pp. 1526-1529 vol. 3.*

Dynamic pressure measurements using silicon carbide transducers; Ned, A.A.; Masheeb, F.; Kurtz, A.D.; Wolff, J.M.; Instrumentation in Aerospace Simulation Facilities, 2001. 19th International Congress on ICIASF 2001 Digital Object Identifier: 10.1109/ICIASF.2001.960256; Publication Year: 2001, pp. 240-245.*

Static stability of Baseline-II blended wing-body aircraft at low subsonic speed: Investigation via computational fluid dynamics simulation; Nasir, Rizal E.M. et al.; Science and Social Research (CSSR), 2010 International Conference on; Digital Object Identifier: 10.1109/CSSR.2010.5773932; Publication Year: 2010, pp. 97-102; IEEE Conference.*

Effect of large amplitude pitch-up motions on un-commanded roll behavior of low swept wings-slender body model; Khan, T.A. ; Xue Ying Deng; Applied Sciences and Technology (IBCAST), 2012 9th International Bhurban Conference on; Digital Object Identifier: 10.1109/IBCAST.2012.6177558; Publication Year: 2012, pp. 229-237.*

* cited by examiner

FIG. 9

ALTERNATIVE METHOD TO DETERMINE THE AIR MASS STATE OF AN AIRCRAFT AND TO VALIDATE AND AUGMENT THE PRIMARY METHOD

RELATED APPLICATION

This application is a continuation of co-pending U.S. patent application Ser. No. 12/255,233, filed Oct. 21, 2008. The aforementioned related patent application is herein incorporated by reference in its entirety.

BACKGROUND INFORMATION

1. Field

The present disclosure relates generally to aircraft and in particular, to a method and apparatus for determining and validating the air mass state of an aircraft.

2. Background

Modern commercial aircraft have increasing demands for availability and integrity of air data. Air data describes the air mass state of an aircraft around the aircraft during flight. This air data is used by pilots and on-board systems to make operational decisions and control actions regarding an aircraft. This air data may include, for example, pitot or total pressure, static pressure, angle of attack, angle of sideslip, and other suitable air data. Conventional sensors used to measure this type of data may be adversely affected by environmental conditions or other conditions or events.

For example, ice or other foreign materials may prevent an accurate measurement of pressure by a pitot tube used to measure total pressure. This type of tube is a pressure measurement instrument used to measure fluid velocity. The measured pressure is the stagnation pressure of the air which is also referred to as total pressure. This measurement, together with static pressure measurements measured using static port sensors on the side of the fuselage, may be used to identify the impact pressure.

The impact pressure may then be used to calculate an airspeed of the aircraft. A pitot tube may become clogged with ice or other foreign materials, resulting in an inaccurate measurement. This type of an inaccurate measurement may result in an inaccurate identification of airspeed for an aircraft.

These types of situations may be avoided through various preventative mechanisms. For example, redundant sensors may be used as well as heating elements to reduce environmental effects. With fly-by-wire aircraft becoming more common, even higher demands are placed on obtaining trustworthy data from air data sensors, because this air data information is used for full-time control augmentation. Closed-loop sideslip control and envelope protection are examples of control augmentations for a fly-by-wire aircraft that rely on air data.

Historically, cross instrument comparators have been implemented to draw the attention of a pilot to the left and right differences of airspeed and altitude. These comparators may be used by a pilot to decide which instrument may be faulty and select only the sensors from which accurate data is being obtained. Other currently used mechanisms provide a voting process in which trusted data is furnished to pilots and various systems on the aircraft. This type of voting system automatically removes data from sources that are determined to be faulty.

It would be advantageous to have an improved method and apparatus for determining and validating air data for an aircraft and addressing the problems as discussed above.

SUMMARY

In one advantageous embodiment, a method is presented for identifying air data for an aircraft. The lift for the aircraft is identified. The number of surface positions for the aircraft is identified. The angle of attack during a flight of the aircraft is identified. A synthetic dynamic pressure is computed from the lift, the number of surface positions, and the angle of attack.

In another advantageous embodiment, an apparatus comprises a computer and an air data process executing on the computer. The air data process is capable of identifying lift for an aircraft, identifying a number of surface positions for the aircraft, and identifying an angle of attack during flight of the aircraft. The air data process is also capable of computing a synthetic dynamic pressure from the lift, the number of surface positions, and the angle of attack.

In yet another advantageous embodiment, a computer program product for identifying air data for an aircraft is present. The computer program product comprises a computer recordable storage medium and program code stored on the computer recordable storage medium. Program code is present for identifying lift for the aircraft. Program code is also present for identifying a number of surface positions for the aircraft. Additionally, program code is present for identifying an angle of attack during flight of the aircraft. Further, program code is present for computing a synthetic dynamic pressure from the lift, the number of surface positions, and the angle of attack.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
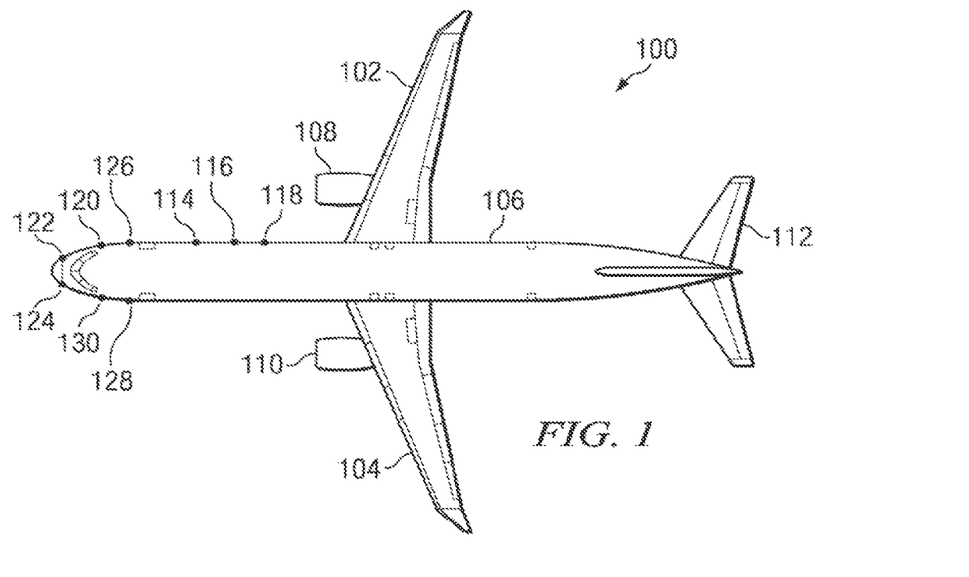
FIG. 1 is a diagram of an aircraft depicted in accordance with an advantageous embodiment.

With reference now to the figures, and in particular, with reference to FIG. 1, a diagram of an aircraft is depicted in which an advantageous embodiment may be implemented. Aircraft 100 is an example of an aircraft in which a method and apparatus for air mass data measurement may be implemented. In this illustrative example, aircraft 100 has wings 102 and 104 attached to fuselage 106. Aircraft 100 includes wing mounted engine 108, wing mounted engine 110, and tail 112. Aircraft 100 may be any fixed wing aircraft, and in other advantageous embodiments, may not have wing mounted engines.

Aircraft 100 also includes a number of different sensors used to obtain information to identify the air mass state for aircraft 100. These sensors include, for example, without limitation, static pressure sensor 114, static pressure sensor 116, static pressure sensor 118, total pressure sensor 120, total pressure sensor 122, total pressure sensor 124, angle of attack sensor 126, angle of attack sensor 128, and angle of attack sensor 130. A number, as used herein, refers to one or more items. For example, a number of sensors is one or more sensors.

Each of the sensors within a particular type of sensor may comprise or act as a channel for cross comparison. For example, static pressure sensor 114, static pressure sensor 116, and static pressure sensor 118 can each provide data for a separate channel to form three channels for cross comparison. Additionally, the information from the different sensors within a particular type of sensor may be used in a voting process to determine what data will be used in providing information to the pilots and/or use in controlling the aircraft.

In these examples, only three of each type of sensor are illustrated on fuselage 106. Of course, in different advantageous embodiments, other numbers of sensors may be used. For example, four or more static air pressure sensors may be used rather than the three illustrated in this example. Further, other advantageous embodiments may be implemented using other configurations other than that illustrated for aircraft 100.

Figure 2:
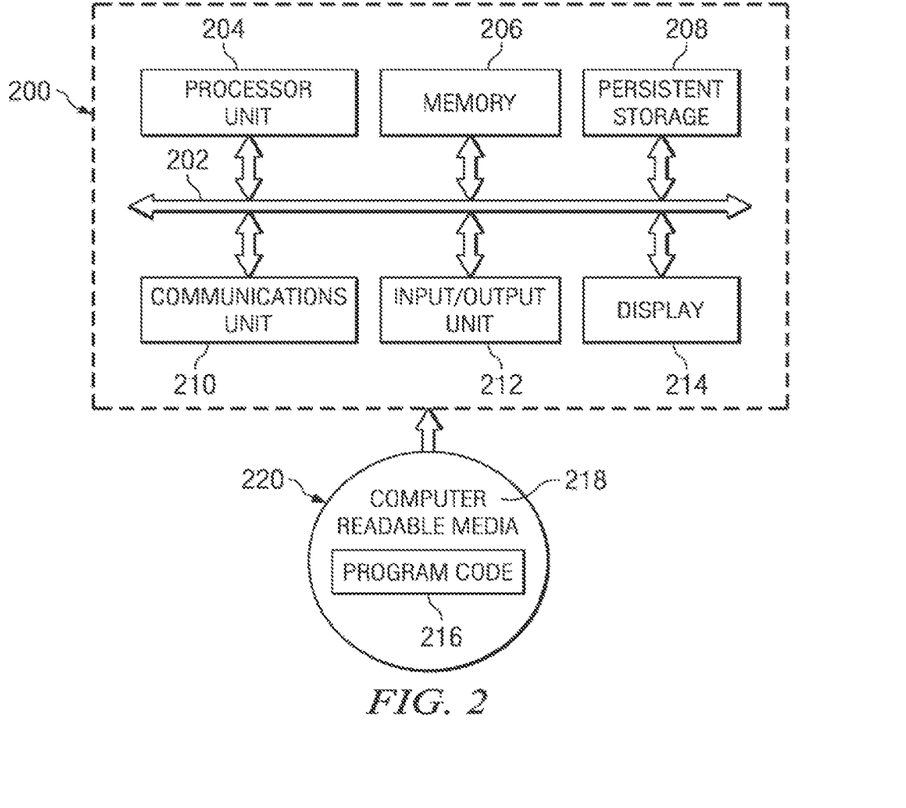
FIG. 2 is a diagram of a data processing system in accordance with an advantageous embodiment.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form such as, for example, an optical or magnetic disc that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions, containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

The different advantageous embodiments recognize and take into account that even with voting and/or with cross-channel monitoring, the availability and/or integrity of air data may not be as high as desired. For example, the different advantageous embodiments recognize that air data sensors also may be vulnerable to rare common cause or common mode faults that may adversely affect like sensors at the same time.

More specifically, the different advantageous embodiments recognize that taped static pressure ports, frozen-over static pressure ports, pitot probes clogged by foreign material, lightning strikes, jammed angle of attack vanes, software errors, and/or other adverse conditions may result in faults that may affect two or more channels of the same type of sensors. The different advantageous embodiments recognize that these faults may be detectable by cross-channel monitors in some, but not all, cases.

However, the different advantageous embodiments recognize that these multiple faults may lead to a loss of valid voted air data and limit the availability of the air data. The different advantageous embodiments also recognize that some common mode faults may affect all three channels equally. As a result, these types of errors may not be detected by cross-channel monitors. Further, these types of faults also may provide misleading voted air data.

The different advantageous embodiments recognize that with modern fly-by-wire aircraft, this type of availability and integrity of data may be unacceptable for operation of the aircraft. The different advantageous embodiments recognize that various control laws used by fly-by-wire systems use airspeed in only a limited range. If the airspeed becomes grossly erroneous, the operation of the aircraft may not be adversely affected.

However, the different advantageous embodiments recognize that newer aircraft may employ control laws designed to use the airspeed over its entire range or a range larger than previously used. As a result, aircraft stability may be compromised if the airspeed is grossly in error.

Thus, the different advantageous embodiments provide a method and apparatus for obtaining highly trustworthy air data using data from different types of sensors to perform tests on the data. In these illustrative examples, highly trustworthy air data is air data that has been validated in a manner that provides a higher level of confidence than the air data without any validation. Highly trustworthy air data may be air data that has a reduction in the possibility of air data with gross errors that may affect the operation of an aircraft. Highly trustworthy air data is also referred to as high integrity air data.

Specifically, data from redundant total and static pressure sensors may be used to synthesize a synthetic angle of attack, which is used to validate the angle of attack measured by redundant angle of attack sensors. Conversely, data from the redundant angle of attack sensors may be used to synthesize a synthetic dynamic pressure, which may be used to validate the dynamic pressure derived from the redundant total and static pressure sensors.

Figure 3:
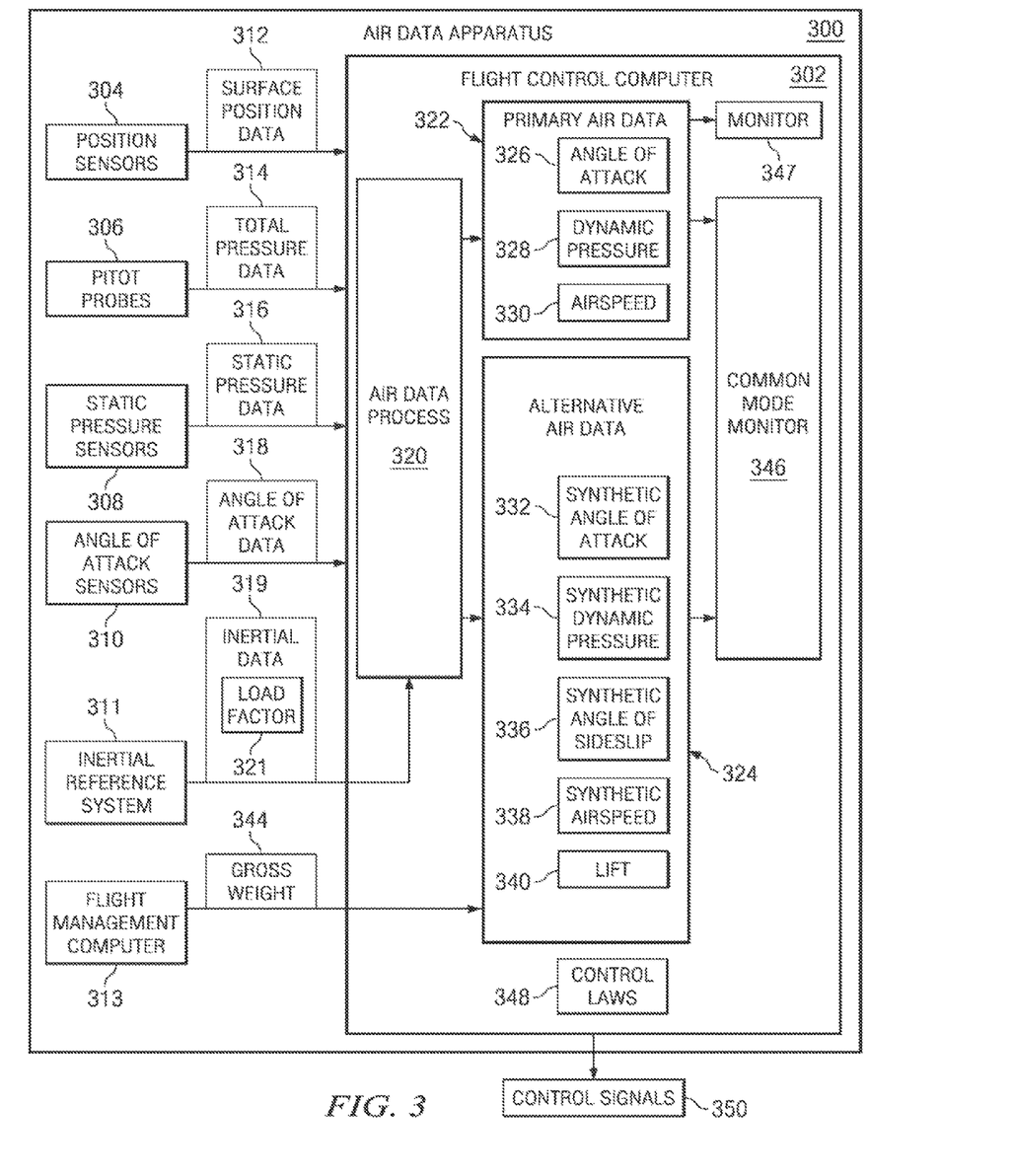
FIG. 3 is a block diagram of an air data system apparatus in accordance with an advantageous embodiment.

With reference now to FIG. 3, a block diagram of an air data system apparatus is depicted in accordance with an advantageous embodiment. Air data apparatus 300 is a block diagram illustrating components that may be implemented in an aircraft such as, for example, aircraft 100 in FIG. 1. Air data apparatus 300 may be used to identify air data for use in generating control signals to control the operation of an aircraft.

In this example, air data apparatus 300 includes flight control computer 302, which is in communication with position sensors 304, pitot probes 306, static pressure sensors 308, angle of attack sensors 310, inertial reference system 311, and flight management computer 313. Position sensors 304, pitot probes 306, static pressure sensors 308, and/or angle of attack sensors 310 may be redundant probes and sensors in these examples. In other words, the different probes and sensors may provide the same information. This redundancy in information is used to enhance the availability and the integrity of the data the sensors measure.

Position sensors 304 generate surface position data 312 for the position of control surfaces and high-lift surfaces on an aircraft. These control surfaces include, for example, elevators, horizontal stabilizers, ailerons, rudders, trim tabs, spoilers, flaps, slats, and other movable surfaces. Position sensors 304 may be associated with actuators used to move and position these control surfaces. Of course, any type of position sensor may be used depending on the particular implementation.

Pitot probes 306 are sensors that measure total pressure data. Pitot probes 306 are examples of total pressure sensors 120, 122, and 124 in FIG. 1. Total pressure may be measured as the moving air is brought to rest within the pitot probe. This pressure is the total pressure within total pressure data 314. Pitot probes 306 may be located on the fuselage of an aircraft.

Static pressure sensors 308 generate static pressure data 316. These sensors also may be located on the fuselage of an aircraft. Static pressure sensors 308 are examples of static pressure sensors 114, 116, and 118 in FIG. 1. Static pressure sensors 308 may take the form of a static port or ports. A static port may be a flush-mounted hole in the fuselage of an aircraft.

Angle of attack sensors 310 generate angle of attack data 318. Angle of attack sensors 310 also may be located on the fuselage of an aircraft. Angle of attack sensors 310 are examples of angle of attack sensors 126, 128, and 130 in FIG. 1. Angle of attack sensors 310 may be implemented using an angle of attack vane. These sensors may be implemented using angle of attack vane sensors. An angle of attack vane sensor is an air data sensor in which the vane is attached to a shaft that may rotate freely. This type of sensor may measure the airplane's angle of attack.

Inertial reference system 311 generates inertial data 319. Inertial data 319 includes data such as, for example, load factor 321. The data from angle of attack sensors 310, pitot probes 306 and static sensors 308 are used by air data process 320 to compute primary air data 322 and alternative air data 324.

Further, inertial data 319 from inertial reference system 311 may also be used to compute alternative air data 324. Primary air data 322, in these examples, includes angle of attack 326, dynamic pressure 328, and airspeed 330. Alternative air data 324 includes synthetic angle of attack 332, synthetic dynamic pressure 334, synthetic angle of sideslip 336, and synthetic airspeed 338. Alternative air data 324 may be used to validate primary air data 322. Additionally, alternative air data 324 may be used in the instance where primary air data 322 cannot be used or is not supplied.

In these examples, angle of attack 326 may be angle of attack data 318 or derived from angle of attack data 318. Dynamic pressure 328 and airspeed 330 may be calculated from total pressure data 314 and static pressure data 316 in these examples.

Synthetic angle of attack 332 may be calculated using surface position data 312, lift 340, and dynamic pressure 328. Lift 340 is calculated by air data process 320.

Lift 340 is calculated using gross weight 344 and load factor 321. In this example, gross weight 344 is the weight estimate for the aircraft. Synthetic dynamic pressure 334 is calculated from lift 340, surface position data 312, and angle of attack data 318.

In these examples, lift 340 may be identified as gross weight 344 of the aircraft times the load factor. This force is a function of three variables. These variables include the positions of high-lift and control surfaces, the dynamic pressure, and the angle of attack of the wing. If lift 340 and surface position data 312 are known, synthetic dynamic pressure may be calculated if angle of attack is also known, and synthetic angle of attack may be calculated if dynamic pressure is also known. The calculation of the synthetic angle of attack results in synthetic angle of attack 332, while the calculation of the synthetic dynamic pressure results in synthetic dynamic pressure 334.

Synthetic dynamic pressure 334 may be used to generate or identify synthetic airspeed 338 of an aircraft. Synthetic dynamic pressure 334 also may be used to validate both total pressure data 314 and static pressure data 316.

Common mode monitor 346 compares primary air data 322 with alternative air data 324. This comparison may be made to determine whether primary air data 322 can be relied upon for performing operations with respect to the aircraft.

For example, common mode monitor 346 may compare synthetic angle of attack 332 with angle of attack 326. This comparison may be made to determine whether angle of attack 326 can be used in operating the aircraft. In a similar fashion, dynamic pressure 328 may be compared with synthetic dynamic pressure 334. Further, common mode monitor 346 also may compare airspeed 330 to synthetic airspeed 338.

These types of comparisons may be made by common mode monitor 346 because of the use of redundant sensors and probes that provide data in a manner that can be used to generate both primary air data 322 and alternative air data 324 for validation. For example, in various embodiments, pitot probes 306 may be three sensors located in different locations on the fuselage of an aircraft.

Static pressure sensors 308 also may comprise three sensors at different locations. In a similar fashion, angle of attack sensors 310 may comprise three sensors in different locations on the fuselage of an aircraft. With pitot probes 306 and static pressure sensors 308, these sensors have a high degree of functional and spatial independence from angle of attack sensors.

These characteristics qualify each type of sensor to compute a dissimilar synthetic version of the other, such as alternative air data 324, to allow common mode monitor 346 to validate the primary version or main source of data, such as primary air data 322.

Also, validation of data from the sensors may be performed by common mode monitor 346. For example, angle of attack 326 and synthetic dynamic pressure 334 may be used by common mode monitor 346 to validate air data such as, for example, total pressure data 314, static pressure data 316, and angle of attack data 318.

As another example, synthetic angle of attack 332 may be compared by common mode monitor 346 against angle of attack 326 to determine whether any faults are equally present in angle of attack sensors 310. In a similar fashion, synthetic dynamic pressure 334 may be compared by common mode monitor 346 against dynamic pressure 328 to monitor and identify faults that may affect equally all of pitot probes 306 or all of static pressure sensors 308.

In this manner, common mode monitor 346 may send primary air data 322, such as total pressure data 314, static pressure data 316, and angle of attack data 318 to flight control computer 302 for use by control laws 348 to generate control signals 350. Control signals 350 may control various components such as, for example, control surfaces, engines, and other suitable devices. Monitor 347 may be another monitor used by flight control computer 302 for comparing data within a group of sensors, such as, for example, within position sensors 304, within pitot probes 306, within static pressure sensors 308, and within angle of attack sensors 310. Monitor 347 may be any monitor such as, for example, an in-line monitor, or some other suitable monitor.

If common mode monitor 346 and/or monitor 347 in air data process 320 determine that certain sensors are not providing air data as needed, control laws 348 or other airplane functions may use the alternative air data 324. This secondary source of data may be, for example, synthetic angle of attack 332 and/or synthetic dynamic pressure 334 for flight control computer 348 to use. Control laws 348 or other airplane functions may use primary air data 322 or alternative air data 324 to generate control signals 350 to control the operation of the aircraft.

Figure 4:
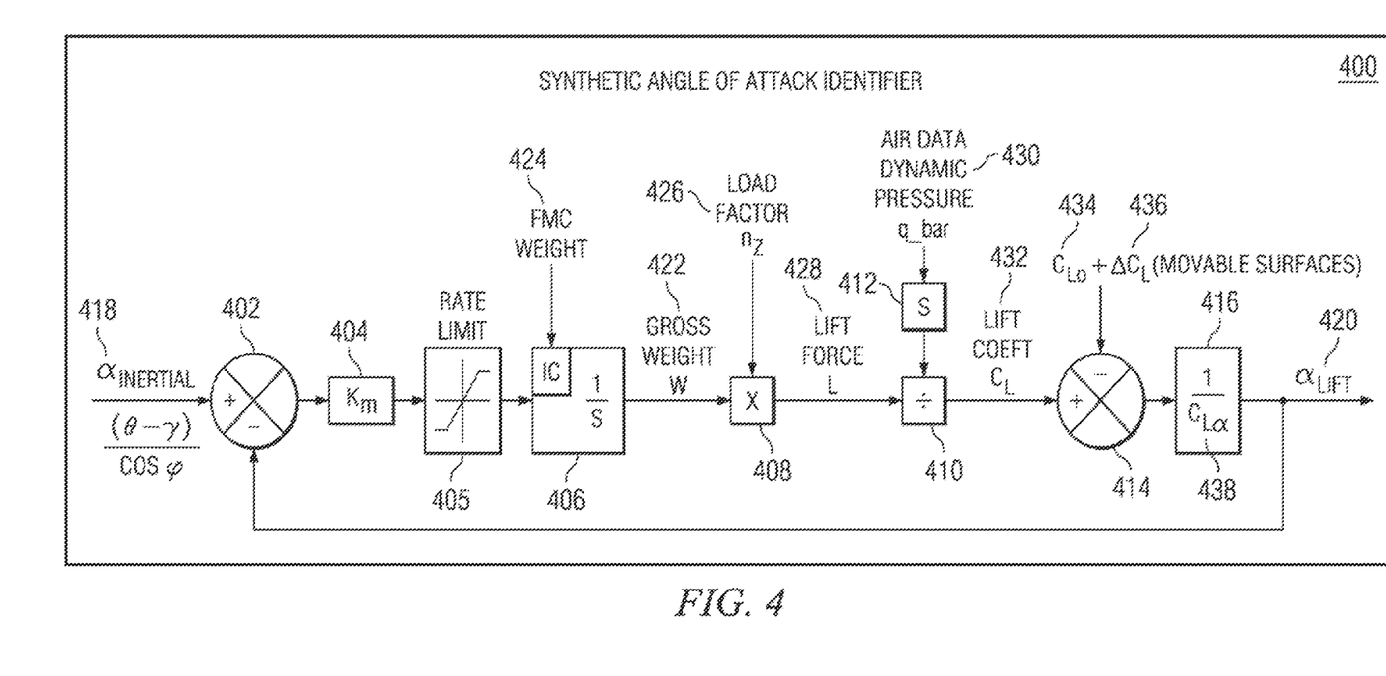
FIG. 4 is a block diagram illustrating functional components for computing a synthetic angle of attack in accordance with an advantageous embodiment.

With reference now to FIG. 4, a block diagram illustrating functional components for computing a synthetic angle of attack is depicted in accordance with an advantageous embodiment. In this example, synthetic angle of attack identifier 400 is an example of a component that may be implemented in air data process 320 to generate synthetic angle of attack 332 in FIG. 3. Synthetic angle of attack identifier 400 contains different functional blocks that may be implemented in software and/or hardware depending on the particular implementation.

Synthetic angle of attack identifier 400 implements the following lift model:

$$C_L = C_{L0} + \Delta C_L(\text{movable surfaces}) + C_{L\alpha} * \alpha$$
$$= W * n_Z \div (\text{q\_bar}) * S$$

-continued or $$a = \left[W\left(\frac{n_Z}{(q\_bar)*S}\right) - C_{L0} - \Delta C_L(\text{movable surfaces})\right] \div C_{L\alpha}$$

where $C_L$ is the lift coefficient, $C_{L0}$ is the lift coefficient at angle of attack equal to zero, $\Delta C_L$ is the change in the lift coefficient caused by high-lift and movable surfaces, $C_{L\alpha}$ is the slope of the lift coefficient as a function of alpha, α is the angle of attack, W is the gross weight, $n_z$ is the load factor, q_bar is the dynamic pressure, and S is the reference area of the wings of the aircraft. This lift model is a simple lift model in these examples. However, in other advantageous embodiments, more complex lift models may be used.

Synthetic angle of attack identifier 400 comprises subtractor 402, constant 404, limiter 405, integrator 406, multiplier 408, divider 410, constant 412, subtractor 414, and divider 416. In these examples, inertial angle of attack 418, $\alpha_{inertial}$, is input into subtractor 402. Inertial angle of attack 418 is equal to the air mass angle of attack only in still air and may be calculated as follows:

$$\frac{\theta - \gamma}{\cos\varphi}$$

where is pitch attitude, is flight path angle, and is roll attitude. Inertial angle of attack, although subject to high-frequency vertical winds, is a precise long-term reference for air mass angle of attack. Another input into subtractor 402 is synthetic angle of attack 420, $\alpha_{lift}$. Synthetic angle of attack 420 is the value generated by synthetic angle of attack identifier 400 and is used as a feedback in a feedback loop within synthetic angle of attack identifier 400.

The difference between inertial angle of attack 418 and synthetic angle of attack 420 is sent into constant 404, $K_m$, which multiplies the output of subtractor 402 by the value of constant 404. In these examples, constant 404 is a gain value. Constant 404 is a gain that may be selected to make the loop time-constant for synthetic angle of attack identifier 400 to be on the order of 1,000 seconds in these illustrative embodiments.

The output of constant 404 is the rate of change of gross weight. It is sent to limiter 405. Limiter 405 limits the rate at which gross weight may change. The limited value generated by limiter 405 is sent to integrator 406. Integrator 406 generates gross weight 422, W. Gross weight 422 is obtained by integrating the output of limiter 405 using flight management computer weight 424 as the starting or initial condition. In other advantageous embodiments, other conditions or values may be used as the initial condition such as, for example, the weight generated during a takeoff roll.

Flight management computer weight 424 is a weight estimate in these depicted examples. This estimate may be used as an initial condition for the weight of the aircraft. Flight management computer weight 424 may be, for example, the sum of the aircraft zero-fuel weight entered by the aircraft dispatcher plus the weight of the fuel from the fuel-quantity measurement system.

The value of constant 404 provides a time-constant that is short enough for gross weight 422 to follow the changing weight of the aircraft while the aircraft flies. The value of constant 404 provides a loop time-constant that is also long enough to prevent gross weight 422 and synthetic angle of attack 420 from following high-frequency errors in inertial angle of attack 418 that may be caused by vertical winds.

Gross weight 422 is multiplied by multiplier 408 with load factor 426, $n_z$. Load factor 426 is the acceleration of the aircraft along the body's Z-axis plus the apparent acceleration due to gravity. The Z-axis is the axis that is normal with respect to the X-Y plane of the body of the aircraft. In load factor 426, z represents the body's Z-axis. In un-accelerated level flight, load factor 426 has a value of 1.0. Lift force 428, L, results from multiplying gross weight 422 by load factor 426.

Dynamic pressure 430 is multiplied by constant 412, S. Constant 412 has a value that is equal to the reference area of the aircraft wing. In these examples, constant 412 is the reference area of the wing in square feet. Lift force 428 is divided by the output of constant 412 to generate lift coefficient 432, $C_L$. This lift coefficient is sent into subtractor 414. Subtractor 414 subtracts lift coefficient 434, $C_{L0}$, which is the lift coefficient at angle of attack equal to zero, and incremental lift coefficient 436, $\Delta C_L$, which is the change in lift coefficient due to high-lift and control surfaces, from lift coefficient 432.

The output of subtractor 414 is sent into divider 416. Divider 416 generates synthetic angle of attack 420. Synthetic angle of attack 420 is computed by dividing the output of subtractor 414 by lift coefficient slope 438, $C_{L\alpha}$, which is the slope of lift coefficient 432 with respect to the angle of attack. This synthetic angle of attack value 420 may be used to validate or calculate other values. Further, synthetic angle of attack 420 is also sent back into subtractor 402 as part of the feedback loop.

Synthetic angle of attack identifier 400 drives synthetic angle of attack 420 to be equal to a long-term value of inertial angle of attack 418. In this manner, synthetic angle of attack 420 may have a precise steady state value. Further, during any trimmed flight condition, any error caused by an imprecise model of the lift coefficient $C_L$, may manifest as an error in gross weight 422 rather than an error in synthetic angle of attack 420.

Integrator 406 may be initialized at takeoff to the gross weight of the aircraft from a flight management computer as flight management computer weight 424. This value is validated at takeoff, because the value may be subject to human error, and therefore, may have a low level of integrity or trustworthiness.

In the different advantageous embodiments, this value may be validated by obtaining an independent estimate of the aircraft weight at the beginning of the aircraft's takeoff roll using Newton's second law:

thrust−drag=$W$×longitudinal acceleration, where W is the estimated aircraft weight used to validate flight management computer weight 424. At takeoff, as the longitudinal acceleration nears the peak value while the aerodynamic drag is still low, a snapshot or identification of the engine total thrust (T) and body longitudinal acceleration ($A_X$) is made. The weight is calculated as a ratio of thrust to longitudinal acceleration.

An adjustment may be made for rolling friction and aerodynamic drag in this calculation. In these examples, if the difference in the takeoff estimate and flight management computer weight 424 is less than an allowable value, flight management computer weight 424 is used as the initial condition in integrator 406. In these examples, the error threshold may be around 15 percent of the average of the estimated weight and flight management computer weight 424.

In the rare circumstance that the difference between the estimated weight and flight management computer weight 424 is greater than around 15 percent, flight management computer weight 424 is considered invalid. The initial condition of integrator 406 is then set equal to around, for example, 90 percent of the maximum takeoff gross weight of the aircraft.

The common mode monitor may be desensitized for a few minutes until gross weight 422 has converged to a correct value in flight. For example, the common mode monitor allowable error threshold between angle of attack 326 in FIG. 3 and synthetic angle of attack 332 in FIG. 3 may be increased until gross weight 422 has converged to a correct value in flight.

Thus, synthetic angle of attack identifier 400 provides a capability to determine synthetic angle of attack 420, which is independent of and dissimilar to angle of attack data 318 from angle of attack sensors 310 in FIG. 3.

Figure 5:
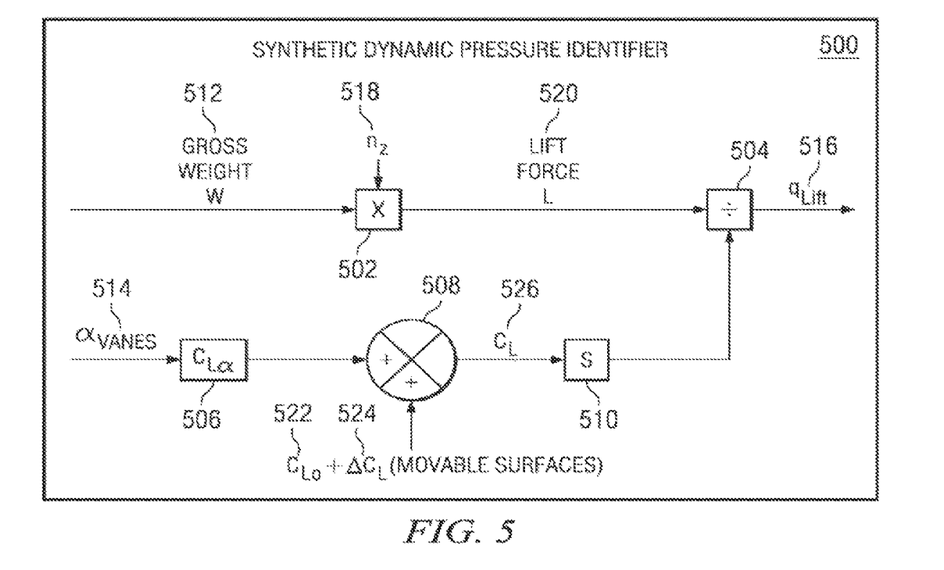
FIG. 5 is a block diagram illustrating functional components for computing a synthetic dynamic pressure in accordance with an advantageous embodiment.

With reference now to FIG. 5, a synthetic dynamic pressure identifier is depicted in accordance with an advantageous embodiment. Synthetic dynamic pressure identifier 500 is an example of components that may be implemented in air data process 320 to generate synthetic dynamic pressure 334 in FIG. 3.

In this example, synthetic dynamic pressure identifier 500 includes multiplier 502, divider 504, constant 506, adder 508, and constant 510. In this example, gross weight 512, W, and angle of attack 514, $\alpha_{vanes}$, are used to calculate or identify synthetic dynamic pressure 516, $q_{lift}$.

Gross weight 512 is multiplied by load factor 518 using multiplier 502. Load factor 518 is similar to load factor 426 in FIG. 4. The results or output of multiplier 502 is lift force 520, L.

Angle of attack 514 is sent into constant 506, which multiplies angle of attack 514 by the value of constant 506. Angle of attack 514 may take the form of angle of attack data 318 as measured using angle of attack sensors 310 in FIG. 3. In these examples, constant 506 is $C_{L\alpha}$, which is the slope of the lift coefficient with respect to angle of attack and is similar to lift coefficient slope 438 in FIG. 4.

The output of constant 506 is added to lift coefficient 522, $C_{L0}$, and incremental lift coefficient 524, $\Delta C_L$, by adder 508. Lift coefficient 522 is similar to lift coefficient 434 in FIG. 4, while incremental lift coefficient 524 is similar to incremental lift coefficient 436 in FIG. 4. The output of adder 508 is lift coefficient 526, $C_L$. Lift coefficient 526 is sent to constant 510. In these examples, constant 510 is the reference area of the wing. The value of constant 510 is multiplied by lift coefficient 526 and sent into divider 504. Divider 504 divides lift force 520 by the output of coefficient 510 to generate synthetic dynamic pressure 516.

Synthetic dynamic pressure 516 may be compared to primary dynamic pressure, such as dynamic pressure 430 in FIG. 4, by common mode monitor 346 to determine whether total pressure data 314 and static pressure data 316 are accurate.

In these examples, synthetic dynamic pressure 516 may not be totally independent of dynamic pressure 430 in FIG. 4. If, however, dynamic pressure 430 slowly becomes erroneous, the feedback loop in synthetic angle of attack identifier 400 may drive gross weight 422 to a corresponding erroneous value that may produce an error in synthetic dynamic pressure 516. Gross weight 512 is the same as gross weight 422 in FIG. 4. The rate of change of gross weight 422 may be limited using limiter 405.

In these examples, limiter 405 is selected to be around 20 percent greater than the rate of change of gross weight 422 that is associated with a maximum possible fuel rate use. This fuel rate use may be identified by a combination of the burn use for climbing plus the maximum fuel jettison rate. In this manner, limiter 405 may prevent the masking of errors in gross weight, synthetic angle of attack, and synthetic dynamic pressure that may occur if primary dynamic pressure becomes erroneous.

The different advantageous embodiments provide a capability to calculate synthetic angle of attack and synthetic dynamic pressure values. These different values may be used as part of a monitoring system to validate, by comparison, primary angle of attack sensors, primary total pressure sensors, and static pressure sensors.

In this manner, the different advantageous embodiments provide a capability for identifying a synthetic angle of attack and a synthetic dynamic pressure that is sufficiently independent of the primary measurements used for angle of attack data and dynamic pressure. Common mode monitor 346 compares the synthetic angle of attack with the voted angle of attack on a continuous basis. A voted measurement is a measurement that results from voting performed on a number of different measurements generated from different sensors.

In other words, a voted measurement may have some data removed if those data points are too different from the other data points for the same parameter. For example, an angle of attack may have three values generated from three different angle of attack sensors. If one of the values is considered too different from the other two values, that value may be removed. Further, a voted value also may be created from the values generated from the sensors. For example, a voted value may be an average or a weighted average in some implementations.

In these examples, common mode monitor 346 also compares the synthetic dynamic pressure with the primary voted dynamic pressure data. Various thresholds in terms of time and magnitude may be selected to be compatible with a particular implementation for an aircraft and expected errors that may occur within compared signals. These errors may be a function of the particular type of lift model used. In some aircraft implementations, the lift model may be as simple as the one described above. In other advantageous embodiments, a lift model may be more complex in which the lift coefficient $C_L$ becomes a function of dependent variables such as the Mach number and the dynamic pressure.

Further, the different advantageous embodiments recognize that engine thrust also may have an effect on the lift coefficient $C_L$, especially at a high angle of attack. To reduce the thrust effect on the lift coefficient $C_L$, different advantageous embodiments may employ a lift coefficient $C_L$ buildup in the aircraft body axes and not in the stability axes. With most aircraft, a thrust line is nearly perpendicular to the body's Z-axis resulting in eliminating first-order thrust effects.

Also in the different advantageous embodiments, the models for lift due to angle of attack are linear. The model may break down at the onset of stall. An angle of attack may top out close to a stall; and if the aircraft exceeds this angle of attack, the differences between the angle of attack that is measured from angle of attack sensors and the synthetic angle of attack may become large.

As a result, in the different advantageous embodiments, the angle of attack and the dynamic pressure common mode monitor 346 are inhibited when the angle of attack exceeds some level close to a stalling level. Also, when the aircraft is on the ground or some or all of its weight is being borne by landing gear, the synthetic angle of attack and the synthetic dynamic pressure may become inaccurate. As a result, common mode monitor 346 is not used when the aircraft is on the ground in these examples.

In another advantageous embodiment, it may be more difficult to model accurately the loss of lift due to spoilers. As a result, common mode monitor 346 may be inhibited or desensitized when speed brakes employing spoilers are deployed. Also, the gross weight integrator may be frozen during these periods of time.

In some applications, second-order thrust effects may be added to a lift model. Some examples of second-order thrust effects include a situation in which the thrust line is not perpendicular to the aircraft body's Z-axis. As a result, a direct component of thrust is present along the Z-axis in this situation. Another example of a typical second-order thrust effect is the extension of flaps, in which the thrust may exhibit a lift component due to flap blowing.

In yet another example, at a high angle of attack, the force associated with changing the direction of the engine inlet mass flow creates lift. These different thrust effects may be estimated without recourse to the measurement of thrust. By measuring the body axis longitudinal acceleration in making an appropriate estimate of airplane drag, a reasonable estimate of thrust effects may be made.

Figure 6:
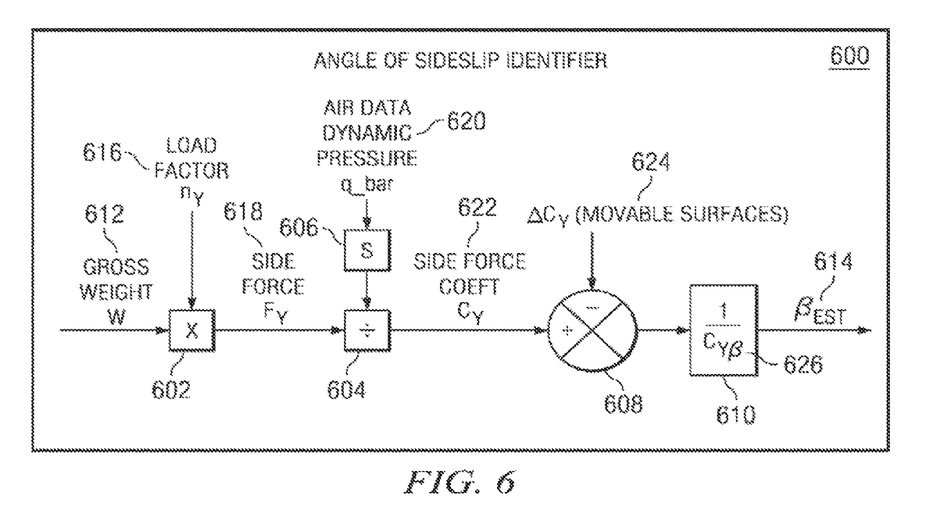
FIG. 6 is a diagram illustrating an angle of sideslip identifier in accordance with an advantageous embodiment.

With reference now to FIG. 6, a diagram illustrating a synthetic angle of sideslip identifier is depicted in accordance with an advantageous embodiment. Angle of sideslip identifier 600 is an example of a process that may be implemented in air data process 320 in FIG. 3.

Angle of sideslip identifier 600 may be identified using a side force model as follows:

$$C_L = C_{L0} + \Delta C_L(\text{movable surfaces}) + C_{L\alpha} * \alpha$$
$$= W * n_Y \div (q\_bar) * S$$

or $$\alpha = \left[W\left(\frac{n_Y}{(q\_bar)*S}\right) - C_{L0} - \Delta C_L(\text{movable surfaces})\right] \div C_{L\alpha}$$

where $C_Y$ is the side force coefficient, $\Delta C_Y$ is the incremental side force coefficient due to control surfaces, $C_{Y\beta}$ is the slope of the side force coefficient as a function of sideslip, $\beta$ is the sideslip angle, W is the gross weight, $n_Y$ is the side load factor, q bar is the dynamic pressure, and S is the wing reference area.

Angle of sideslip identifier 600 includes multiplier 602, divider 604, constant 606, subtractor 608, and divider 610. In these examples, gross weight 612, W, is used to obtain synthetic angle of sideslip 614, $\beta_{EST}$. Gross weight 612 is multiplied by load factor 616, $n_Y$, at multiplier 602. The output of multiplier 602 is side force 618, $F_Y$. Side force 618 is sent into divider 604. Dynamic pressure 620 is multiplied by constant 606, S, which has a value that is equal to the wing reference area. The output of constant 606 is sent into divider 604. Side force 618 is divided by the output of constant 606 to generate side force coefficient 622, $C_Y$. This coefficient is sent into subtractor 608.

Subtractor 608 subtracts incremental side force coefficient 624, $\Delta C_Y$, which is the change in side force due to the position of control and high-lift surfaces from side force coefficient 622, $C_Y$. The output of subtractor 608 is sent into divider 610. Divider 610 generates synthetic angle of sideslip 614. Synthetic angle of sideslip 614 is generated by dividing the output of subtractor 608 by side force coefficient slope 626, $C_{Y\beta}$.

Synthetic angle of sideslip 614 may be compared to data from a primary sensor suite that is used to sense the angle of sideslip, such as sideslip vanes, in order to validate the latter. Synthetic angle of sideslip may be used as the sole means of sensing angle of sideslip. Further, synthetic angle of sideslip 614 may be used as a backup to a primary source of angle of sideslip vanes.

Further, with the different advantageous embodiments, the values generated may be used to provide a dissimilar source of angle of sideslip for use in cockpit displays in an aircraft when the primary mechanism for generating a display of angle of sideslip is lost or is suspected of being erroneous.

Figure 7:
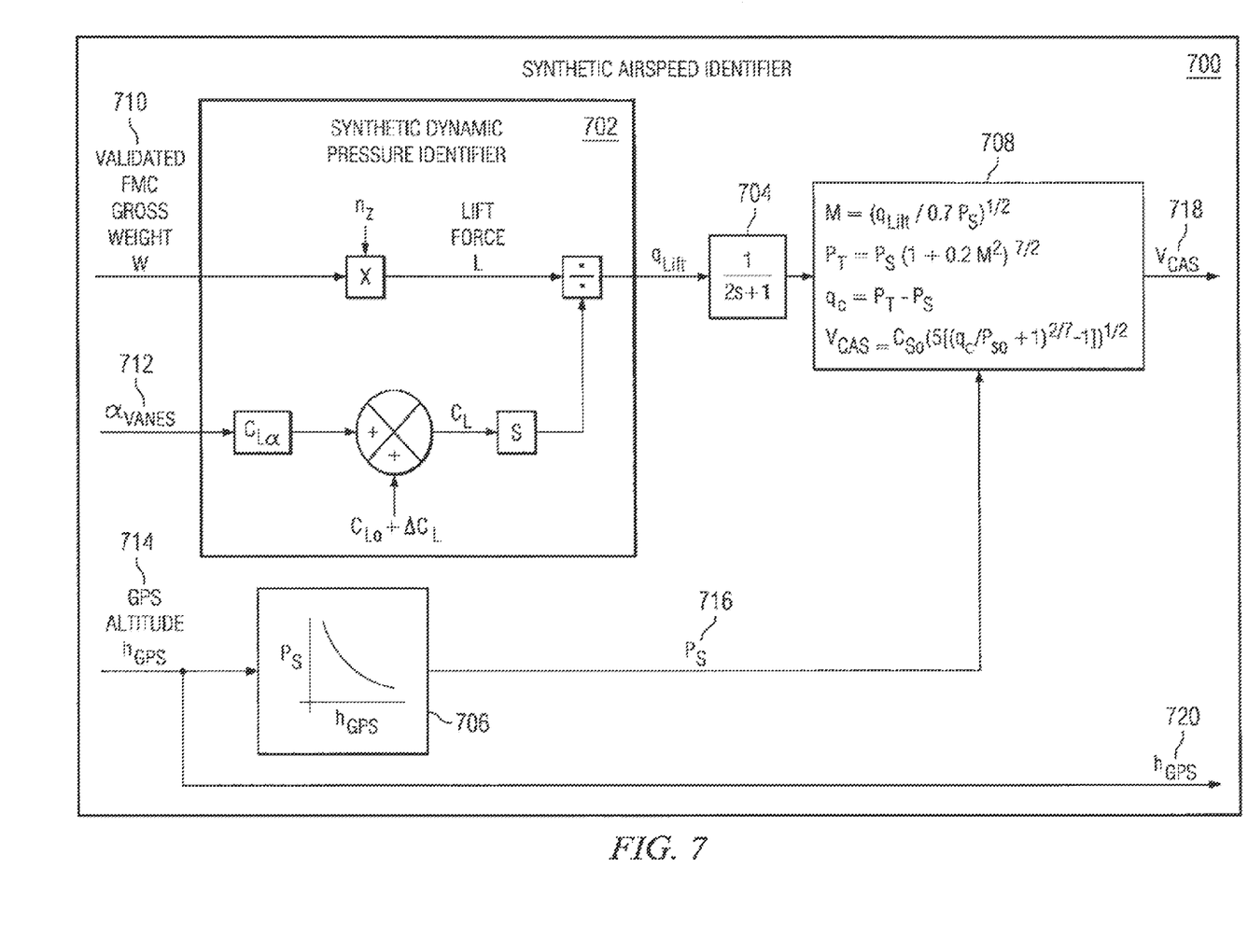
FIG. 7 is a diagram illustrating a synthetic airspeed identifier in accordance with an advantageous embodiment.

With reference now to FIG. 7, a diagram illustrating a synthetic airspeed identifier is depicted in accordance with an advantageous embodiment. In this example, synthetic airspeed identifier 700 may be used to generate an alternate source for airspeed information for use by a pilot when the primary source of air data for generating a valid airspeed is lost or suspected to be erroneous.

In this example, synthetic airspeed identifier 700 includes synthetic dynamic pressure identifier 702, filter 704, and speed function 708. Synthetic dynamic pressure identifier 702 may be implemented using a synthetic dynamic pressure identifier similar to that shown as synthetic dynamic pressure identifier 500 in FIG. 5, but using validated flight management computer gross weight rather than estimated gross weight.

The input into synthetic dynamic pressure identifier 702 is validated flight management computer gross weight 710, which may be the value, validated at takeoff, from the flight management computer. This flight management computer may be flight management computer 313 in FIG. 3. Additionally, angle of attack 712 is another input which may be angle of attack data 318 in FIG. 3. The output of synthetic dynamic pressure identifier 702 is sent into first-order low-pass filter 704.

First-order low-pass filter 704 functions as a first-order 0.5 radian per second filter. The frequency, 0.5 radians per second, is denoted by the 2 in the denominator, indicating a frequency of one-half. In this manner, frequencies above 0.5 radians per second are attenuated. The output of filter 704 is sent into speed function 708.

An additional input into synthetic airspeed identifier 700 is altitude 714, $h_{GPS}$. Altitude 714 may be an altitude identified by a global positioning system within an aircraft in these examples. This altitude 714 is sent into block 706. Block 706 generates static pressure 716, $P_S$, which is sent to speed function 708. Speed function 708 generates synthetic airspeed 718, $V_{CAS}$, which is output by synthetic airspeed identifier 700. Synthetic airspeed identifier 700 also outputs altitude 720, $h_{GPS}$.

Block 706 may be used to identify the static pressure as calculated from altitude 714. Assuming a standard pressure lapse rate, static pressure may be calculated from altitude 714 in these examples.

Speed function 708 calculates synthetic airspeed 718 by calculating a mach value, M, a total pressure, $P_T$, and an impact pressure, $q_c$. These values and static pressure 716 are used to generate synthetic airspeed 718. Mach may be calculated using the following equation:

$$M = \left(\frac{q_{Lift}}{0.7 P_s}\right)^{1/2}$$

The total pressure may be calculated using the mach value with the following equation:

$$P_T = P_S(1 + 0.2\, M^2)^{7/2}$$

Next, the value for the impact pressure may be calculated using the following:

$$q_c = P_T - P_S$$

Synthetic airspeed 718 may be calculated using the following equation:

$$V_{CAS} = C_{So}\left(5\left[\left(\frac{q_c}{P_{so}} + 1\right)^{2/7} - 1\right]\right)^{1/2}$$

In these examples, altitude 714 may differ from a pressure altitude identification by around 2,000 feet or more. The relationship of the synthetic airspeed may be weak, and the error may be small. For example, a synthetic airspeed error per 1,000 feet of altitude error is less than around 0.1 knot at 150 knots at sea level and is less than around 1.3 knots at M=0.85 at around 30,000 feet. The output of synthetic airspeed 718 may be sent to a low-pass filter 704 to reduce noise. This filter's bandwidth may be adjusted to suit the particular implementation.

The accuracy of synthetic airspeed 718 may be directly related to the lift model used. In these examples, the flight management computer gross weight is used rather than the estimated gross weight. As a result, synthetic airspeed 718 may have a steady state error in trim level conditions. This error may provide an accuracy that is on the order of plus or minus 5 knots, 2-sigma over a normal operating envelope. When valid pressure altitude from the air data system is lost, the global positioning system altitude may be displayed to the crew along with synthetic airspeed to provide an alternate source of data.

Further, with the different advantageous embodiments, the values generated may be used to provide a dissimilar source of airspeed for use in cockpit displays in an aircraft when the primary mechanism for generating a display of airspeed is lost or is suspected of being erroneous.

Figure 8:
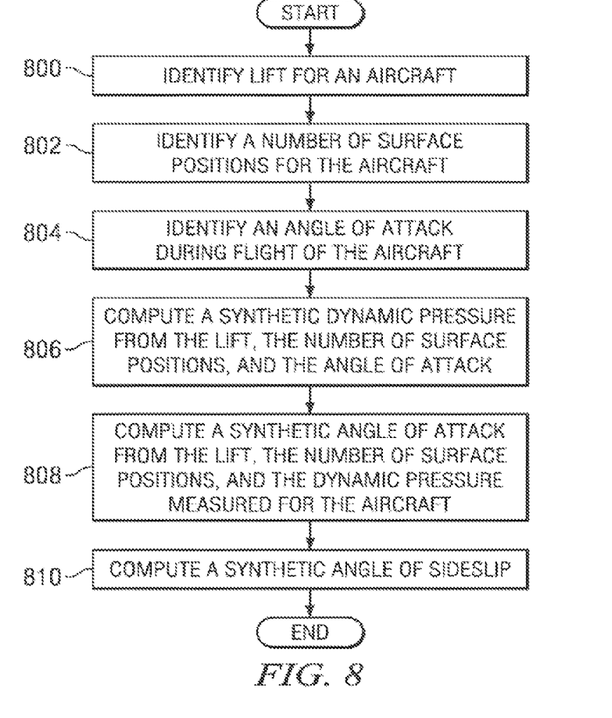
FIG. 8 is a flowchart of a process for identifying air data for an aircraft in accordance with an advantageous embodiment.

With reference now to FIG. 8, a flowchart of a process for identifying air data for an aircraft is depicted in accordance with an advantageous embodiment. The process illustrated in FIG. 8 may be implemented in a software component such as, for example, air data process 320 in FIG. 3.

The process begins by identifying lift for the aircraft (operation 800). Thereafter, a number of surface positions for the aircraft is also identified (operation 802). The number of surface positions may be positions of control surfaces and high-lift surfaces. An angle of attack during the flight of the aircraft is identified (operation 804).

The process computes a synthetic dynamic pressure from the lift, the number of surface positions, and the angle of attack (operation 806). The process also computes a synthetic angle of attack from the lift, the number of surface positions, and the dynamic pressure measured for the aircraft (operation 808). The process may then also compute a synthetic angle of sideslip (operation 810), with the process terminating thereafter.

Figure 9:
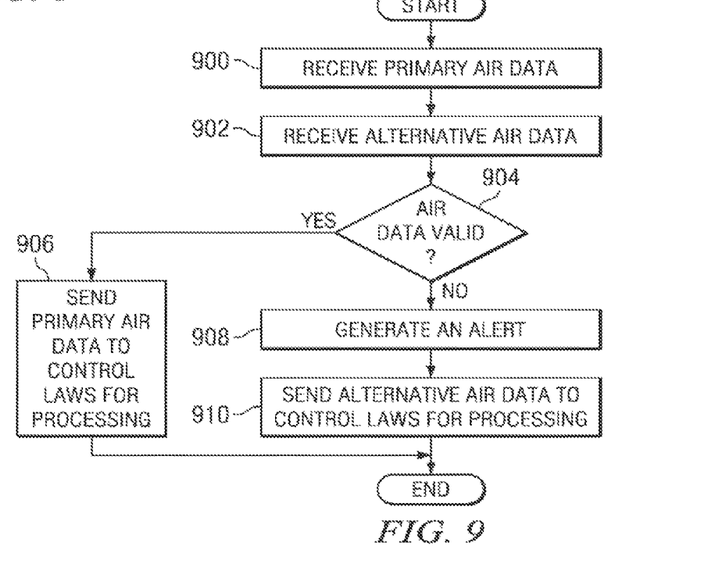
FIG. 9 is a flowchart of a process for managing air data in accordance with an advantageous embodiment.

With reference now to FIG. 9, a flowchart of a process for managing air data is depicted in accordance with an advantageous embodiment. The process illustrated in FIG. 9 may be implemented in a software component such as, for example, common mode monitor 346 in FIG. 3.

The process begins by receiving primary air data (operation 900). The process also receives alternative air data (operation 902). A validation of the primary air data is formed (operation 904). This validation is performed using the alternative air data.

If the primary air data is valid, the primary air data is sent to control laws for processing (operation 906). The control laws may use this air data to generate commands to control various operations of the aircraft. The process terminates thereafter.

With reference again to operation 904, if the primary air data is not valid, an alert may be generated (operation 908). This alert may be an indicator or some other message that may be displayed to the crew within the aircraft. The process then sends alternative air data to the control laws for processing (operation 910), with the process terminating thereafter.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or computer-usable program code such that when the computer-readable or computer-usable program code is executed on a computer, the execution of this computer-readable or computer-usable program code causes the computer to transmit another computer readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples include modems and network adapters. These are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for controlling an aircraft, comprising:
    continuously sensing first data directly from air using aircraft sensors, the aircraft sensors comprising a sideslip vane;
    continuously sensing second data comprising dynamic pressure, inertial data, control surface position data, and a gross weight of an aircraft;
    continuously determining a primary value of sideslip based on the first data;
    issuing, by one or more computer processors, control signals to at least one of control surfaces or engines for the aircraft based on the determined primary value of sideslip
    continuously determining a synthetic value of the sideslip based on the second data;
    continuously calculating a difference between the determined primary value of sideslip and the determined synthetic value of sideslip;
    upon the calculated difference exceeding a threshold amount, providing an alert;
    receiving, in response to the provided alert, a selection of the determined synthetic value of sideslip; and
    issuing, by the one or more computer processors, control signals to at least one of control surfaces or engines for the aircraft based on the selected determined synthetic value of sideslip.

2. A method for controlling an aircraft, comprising:
    continuously sensing first data with at least one first aircraft sensor;
    continuously sensing second data with at least one second aircraft sensor, wherein the at least one second aircraft sensor is of a different type than the at least one first aircraft sensor and that does not share a common cause fault with the at least one first aircraft sensor;
    continuously calculating a primary value of a parameter based on the first data;
    issuing, by one or more computer processors, control signals to at least one of control surfaces or engines for the aircraft based on the calculated primary value of the parameter;
    continuously calculating a synthetic value of the parameter based on the second data;
    continuously calculating a difference between the calculated primary value of the parameter and the calculated synthetic value of the parameter;
    upon the calculated difference exceeding a threshold amount, outputting an alert;
    receiving, in response to the output alert, a selection of the calculated synthetic value of the parameter; and
    issuing, by the one or more computer processors, control signals to at least one of control surfaces or engines for the aircraft based on the calculated synthetic value of the parameter in response to receiving the selection of the calculated synthetic value.

3. The method of claim 2, wherein the at least one first aircraft sensor includes at least one of: a pitot probe, a static pressure sensor, an angle of attack sensor, and a sideslip vane.

4. The method of claim 2, wherein the parameter comprises at least one of dynamic pressure, sideslip, static pressure, angle of attack, total pressure, and airspeed.

5. The method of claim 1, wherein the determining the synthetic value of the sideslip comprises determining a side force coefficient and determining the alternative value as the sideslip associated with the side force coefficient and the control surface position data.

6. The method of claim 5, wherein the determining the side force coefficient is based on the gross weight, a load factor of the inertial data, and the dynamic pressure.

7. The method of claim 2, wherein receiving the selection comprises receiving a selection of the primary value as the selected value upon determining that the primary value is valid, otherwise receiving a selection of the synthetic value upon determining that the primary value is not valid.

8. The method of claim 7, wherein the at least one first aircraft sensor comprises a plurality of first aircraft sensors each disposed at respective different locations on the aircraft, and
    wherein the determining that the primary value is valid comprises comparing respective instances of the first data received from respective ones of the plurality of first aircraft sensors.

9. The method of claim 2, wherein the second data comprises at least one of: inertial data, control surface position data, and a gross weight of an aircraft.

10. A method for controlling an aircraft, comprising:
    continuously sensing first data directly from air using aircraft sensors, the aircraft sensors comprising a pitot tube, and a static pressure sensor;
    continuously sensing second data comprising an angle of attack, inertial data, control surface position data, and a gross weight of an aircraft;

continuously calculating a primary value of dynamic pressure based on the first data;

issuing, by one or more computer processors, control signals to at least one of control surfaces or engines for the aircraft based on the calculated primary value of dynamic pressure;

continuously calculating a synthetic value of the dynamic pressure based on the second data;

continuously calculating a difference between the calculated primary value of dynamic pressure and the calculated synthetic value of dynamic pressure;

upon the calculated difference exceeding a threshold amount, providing an alert;

receiving, in response to the provided alert, a selection of the synthetic value; and issuing, by the one or more computer processors, control signals to at least one of control surfaces or engines for the aircraft based on the selected value.

11. The method of claim 1, wherein continuously determining a synthetic value of the sideslip based on the second data comprises:

calculating a side force by multiplying the gross weight of the aircraft by a side load factor derived from the inertial data;

calculating an area dynamic pressure by multiplying dynamic pressure from air data by an area of the wing calculating a side force coefficient by dividing the side force by the area dynamic pressure;

calculating a total side force coefficient by subtracting any change in side force coefficient caused by control surface positions from the calculated side force coefficient; and calculating synthetic sideslip by dividing the total side force coefficient by a side force coefficient slope for the aircraft.

12. The method of claim 10, wherein the determining the synthetic value of the dynamic pressure is determined based on lift force, a lift coefficient, and a reference area of a wing of the aircraft.

13. A method for controlling an aircraft, comprising:

continuously sensing first data directly from air using aircraft sensors, the aircraft sensors comprising a pitot tube and a static pressure sensor;

continuously sensing second data comprising an angle of attack, inertial data, control surface position data, altitude information, and a gross weight of an aircraft;

continuously determining a primary value of airspeed based on the first data;

issuing, by one or more computer processors, control signals to at least one of control surface or engines for the aircraft based on the determined primary value of airspeed;

continuously determining a synthetic value of the airspeed based on the second data;

continuously calculating a difference between the determined primary value of airspeed and the determined synthetic value of airspeed;

upon the calculated difference exceeding a threshold amount, providing an alert;

receiving, in response to the provided alert, a selection of the determined synthetic value of airspeed; and issuing, by the one or more computer processors, control signals to at least one of control surfaces or engines for the aircraft based on the selected determined synthetic value of airspeed.

14. The method of claim 13, wherein the determining the synthetic value of the airspeed is determined based on an isentropic compressible flow relationship utilizing synthetic dynamic pressure and a static pressure.

15. The method of claim 14, wherein the determining the synthetic value of the airspeed comprises determining synthetic dynamic pressure based on a lift force, a lift coefficient, and a reference area of a wing of the aircraft.

16. The method of claim 13, wherein the selecting includes comparing the primary value of airspeed to the synthetic value of airspeed.

17. The method of claim 13, further including displaying the synthetic value within a cockpit upon selecting the synthetic value as the selected value.

18. A method for controlling an aircraft, comprising:

continuously sensing first data of an angle of attack using an angle of attack sensor;

continuously sensing second data comprising inertial data, dynamic pressure, control surface position data, and a gross weight of an aircraft;

continuously calculating a primary value of the angle of attack based on the first data;

issuing, by one or more computer processors, control signals to at least one of control surfaces or engines for the aircraft based on the calculated primary value of the angle of attack;

continuously calculating a synthetic value of the angle of attack based on the second data;

continuously calculating a difference between the primary value of the angle of attack and the synthetic value of the angle of attack;

upon the calculated difference exceeding a threshold amount, providing an alert;

receiving, in response to the provided alert, a selection of the calculated synthetic value of the angle of attack; and issuing, by the one or more computer processors, control signals to at least one of control surfaces or engines for the aircraft based on the selected calculated synthetic value of angle of attack.

19. The method of claim 13, wherein continuously determining the synthetic value of the airspeed based on the second data comprises:

calculating lift force by multiplying the gross weight by a load factor derived from the inertial data;

calculating a lift coefficient by multiplying the angle of attack by a slope of a lift coefficient for the wing of the aircraft and then adding the lift coefficient at a zero angle of attack for the wing and any change in lift coefficient caused by control surface positions;

calculating an area lift coefficient by multiplying the calculated lift coefficient by an area of the wing;

calculating a synthetic value of dynamic pressure by dividing the calculated lift force by the calculated area lift coefficient;

calculating a static air pressure based on the altitude information and a standard pressure lapse rate curve;

calculating a synthetic Mach number based on the calculated synthetic value of dynamic pressure and the calculated static air pressure;

calculating a total air pressure based on the static pressure and Mach number;

calculating an impact pressure by subtracting the calculated static air pressure from the calculated total air pressure; and calculating the synthetic value of the air speed based on the speed of sound at sea level in standard atmospheric conditions, the static air pressure at sea level in standard atmospheric conditions, and the calculated impact pressure.

20. The method of claim 18, wherein the determining the synthetic value of the angle of attack comprises determining a coefficient of lift and determining the alternative value as the angle of attack associated with the coefficient of lift and the control surface position data.

21. The method of claim 20, wherein the determining the coefficient of lift is based on a calculated gross weight, a load factor of the inertial data, the dynamic pressure, and a reference area of a wing of the aircraft.

22. The method of claim 21, wherein the calculated gross weight is based on the gross weight, an inertial angle of attack and a feedback loop of the synthetic value.

23. The method of claim 18, wherein calculating the synthetic value of the angle of attack based on the second data comprises:
  calculating a pitch difference by subtracting flight path angle from pitch attitude angle, wherein the inertial data comprises the flight path angle and the pitch attitude angle;
  calculating inertial angle of attack by dividing the calculated pitch difference by a cosine of the roll attitude, wherein the inertial data comprises the roll angle;
  calculating an angle of attack difference by subtracting a previously calculated synthetic angle of attack from a feedback loop from the calculated inertial angle of attack;
  calculating a rate of change of gross weight by multiplying the angle of attack difference by a gain value;
  calculating a current gross weight for the aircraft by limiting the rate of change of gross weight to be within a range of rates of change of gross weight and integrating the limited rate of change of gross weight, using a starting gross weight of the aircraft, wherein the gross weight of the aircraft of the second data comprises the starting gross weight;
  calculating a lift force by multiplying the calculated current gross weight by a load factor derived from the inertial data;
  calculating an area dynamic pressure by multiplying dynamic pressure from air data by an area of the wing;
  calculating a lift coefficient by dividing the lift force by the area dynamic pressure;
  subtracting a total lift coefficient by substracting the lift coefficient at a zero angle of attack for the wing and any change in lift coefficient caused by control surface positions from the calculated lift coefficient; and
  calculating synthetic angle of attack by dividing the total lift coefficient a lift coefficient slope for the aircraft.

24. The method of claim 10, wherein continuously calculating the synthetic value of the dynamic pressure based on the second data comprises:
  calculating lift force by multiplying the gross weight by a load factor derived from the inertial data;
  calculating a lift coefficient by multiplying the angle of attack by a slope of a lift coefficient for the wing of the aircraft and then adding the lift coefficient at a zero angle of attack for the wing and any change in lift coefficient caused by control surface positions;
  calculating an area lift coefficient by multiplying the calculated lift coefficient by an area of the wing; and
  calculating the synthetic value of the dynamic pressure by dividing the calculated lift force by the calculated area lift coefficient.

* * * * *

UNITED STATES PATENT AND TRADEMARK OFFICE
CERTIFICATE OF CORRECTION

PATENT NO. : 9,731,814 B2
APPLICATION NO. : 14/282875
DATED : August 15, 2017
INVENTOR(S) : Melville Duncan Walter McIntyre et al.

It is certified that error appears in the above-identified patent and that said Letters Patent is hereby corrected as shown below:

In Column 19, Line 50, in Claim 13, delete "surface or engines" and insert -- surfaces or engines --, therefor.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*